(12) United States Patent
Babine et al.

(10) Patent No.: US 7,654,464 B2
(45) Date of Patent: Feb. 2, 2010

(54) METHOD OF PROCESSING A TICKET ORDER

(75) Inventors: Sheila A. Babine, Arlington, MA (US); Joseph Ford, Woburn, MA (US); Ralph Troutman, Philadelphia, PA (US)

(73) Assignee: Avery Dennison Corporation, Pasadena, CA (US)

( * ) Notice: Subject to any disclaimer, the term of this patent is extended or adjusted under 35 U.S.C. 154(b) by 250 days.

(21) Appl. No.: 11/376,639

(22) Filed: Mar. 10, 2006

(65) Prior Publication Data

US 2006/0220865 A1 Oct. 5, 2006

Related U.S. Application Data

(60) Provisional application No. 60/661,105, filed on Mar. 11, 2005.

(51) Int. Cl.
*G06K 19/00* (2006.01)

(52) U.S. Cl. .............. 235/487; 235/375; 340/10.1; 340/572.1; 707/10

(58) Field of Classification Search ........... 235/487, 235/375; 340/10.1, 572.1; 707/10
See application file for complete search history.

(56) References Cited

U.S. PATENT DOCUMENTS

| | | | | |
|---|---|---|---|---|
| 5,315,508 | A * | 5/1994 | Bain et al. | 705/28 |
| 6,107,920 | A | 8/2000 | Eberhardt et al. | |
| 6,206,292 | B1 | 3/2001 | Robertz et al. | |
| 6,327,972 | B2 | 12/2001 | Heredia et al. | |
| 6,993,573 | B2 | 1/2006 | Hunter | |
| 7,207,481 | B2 | 4/2007 | Barenburg et al. | |
| 7,261,235 | B2 | 8/2007 | Barenburg et al. | |
| 2002/0023949 | A1 * | 2/2002 | Tucker et al. | 232/45 |
| 2002/0030854 | A1 * | 3/2002 | Schutz et al. | 358/1.18 |
| 2002/0038267 | A1 | 3/2002 | Can et al. | |
| 2003/0061217 | A1 | 3/2003 | Whittingham et al. | |
| 2003/0076538 | A1 | 4/2003 | Whittingham et al. | |
| 2003/0132854 | A1 | 7/2003 | Swan et al. | |
| 2003/0150911 | A1 * | 8/2003 | Joseph | 235/382 |
| 2004/0195321 | A1 | 10/2004 | Silverbrook et al. | |
| 2004/0195342 | A1 | 10/2004 | Silverbrook et al. | |
| 2004/0210319 | A1 | 10/2004 | Lapstun et al. | |
| 2004/0254842 | A1 | 12/2004 | Kirkegaard | |

(Continued)

*Primary Examiner*—Allyson N Trail
(74) *Attorney, Agent, or Firm*—Kriegsman & Kriegsman

(57) ABSTRACT

A method of processing a ticket order requesting the production of an identification tag for an article of commerce can be accomplished in the following manner. In the first step, a ticketing services provider receives the ticket order placed by the client, the ticket order including, inter alia, order information (e.g., purchase order information) with respect to the article to which the tag is to be affixed. Having received the order, the ticketing services provider associates a unique identification code, such as an automatically-retrievable electronic product code (EPC), with the identification tag (e.g., by programming the IC chip of an RFID tag with the unique identification code). In turn, a file is stored in an electronically-accessible database which links the unique identification code for the ID tag with the order information for the article to which the tag is to be affixed. In this manner, the client can retrieve the order information relating to each individual article of commerce that it produces. The ability to track order information for individual articles of commerce is useful in, among other things, anti-counterfeit, anti-diversion, inventory management and article return applications.

20 Claims, 5 Drawing Sheets

U.S. PATENT DOCUMENTS

| | | |
|---|---|---|
| 2005/0091821 A1* | 5/2005 | Best et al. .................. 29/430 |
| 2006/0010042 A1* | 1/2006 | Gianakis et al. ............... 705/26 |
| 2006/0180647 A1* | 8/2006 | Hansen ....................... 235/375 |
| 2006/0252489 A1* | 11/2006 | Walker et al. .................. 463/17 |
| 2006/0288072 A1* | 12/2006 | Knapp et al. ................. 709/203 |

* cited by examiner

METHOD OF PROCESSING A TICKET ORDER

CROSS-REFERENCE TO RELATED APPLICATIONS

The present application claims the benefit under 35 U.S.C. 119(e) of U.S. provisional Patent Application Ser. No. 60/661,105, filed Mar. 11, 2005, the disclosure of which is incorporated herein by reference.

BACKGROUND OF THE INVENTION

The present invention relates generally to the retail industry and more particularly to ticketing services in the retail industry.

In the retail industry, articles of commerce are traditionally provided with one or more identification tags (also referred to herein simply as tags, tickets or labels) to communicate pertinent information relating to the articles. For example, an article of clothing is commonly provided with a permanent label which may inform a consumer of, among other things, the name of the manufacturer and/or instructions for washing the article. As another example, an article of clothing is commonly provided with a removable tag which is designed for separation from the article after purchase, the removable tag informing a consumer of, among other things, the price, size and style of the article at the point-of-sale.

The production costs associated with the printing, sorting, packing and shipping of individual labels (e.g., labor, equipment and facilities) are often too large for a manufacturer to absorb. As a result, many retail companies often out-source either a portion or all of their ticketing services to a specialist in the ticketing industry. As will be described further in detail below, the out-sourcing of global ticketing services provides clients (e.g., vendors, retailers, etc.) with not only the individual identification tags but also the management services associated with the production of the tags (e.g., printing, consolidating, shipping, etc.).

Avery Dennison Corporation of Pasadena, Calif., is widely regarded as an innovator and pioneer in the retail ticketing services industry. FIG. 1 is a simplified block diagram of a ticketing system that is useful in describing a proprietary business model which Avery Dennison Corporation (hereinafter referred to simply as Avery) has developed to provide its clients with global ticketing services in the retail industry, the ticketing system being identified generally by reference numeral 11. As can be seen in FIG. 1, Avery's proprietary business model utilizes a network-based ticketing system to promote efficient and accurate ticket production and management services.

As part of Avery's proprietary business model, a ticketing services provider (i.e., Avery) in the network-based ticketing system is set up to receive one or more ticket orders from its client. The ticketing services provider is then responsible for overseeing the manufacture of identification tags at any one of its globally-diverse print centers. The manufactured tickets are then routed to the manufacturing facility where the client's articles are being made. At that time, each ticket is affixed to a corresponding article.

An example of one of Avery's proprietary business models for providing global ticketing services is presently commercialized under the name of Ticket Express™.

Referring now to the details of FIG. 1, ticketing system 11 includes a ticketing services provider 13 (e.g, Avery) which serves as the epicenter, or core, of the entire ticketing system. Ticketing services 11 additionally includes a vendor 15 (i.e., the manufacturer of a particular article of commerce), a manufacturing facility 17 (i.e., the particular facility where the particular article of commerce is made) and a retailer 19 (i.e., the place where the particular article of commerce is ultimately offered for sale). As will be described further in detail below, ticketing system 11 provides a client (namely, vendor 15 and/or retailer 19) with a third party means (i.e., ticketing services provider 13) for supplying a manufacturing facility 17 with the necessary tags for its manufactured, but yet untagged, articles of commerce. As defined herein, ticketing system 11 is referred to as a closed-loop system in that the all of the constituents of system 11 are either affiliated or contracted by the client requesting the ticketing services and, as a consequence, have standardized/compatible system hardware and software tools (the standardization of the tools for the constituents often being provided as part of the services offered by provider 13).

As noted briefly above, ticketing services provider 13 includes a network of facilities which together provide a client with global retail ticketing services. Ticketing services provider 13 includes a centralized hub 21 which serves as the epicenter, or core, of its ticketing services, centralized hub 21 comprising a hub server 23 and a hub database 25 which are connected through an electronic communication path 27 (e.g., a local area network). Preferably, vendor 15, manufacturing facility 17 and retailer 19 are all electronically linked to hub 21 via electronic communication paths 29, 31 and 33, respectively. For example, a personal computer (PC) 35 may be used by one or more of said constituents to electronically communicate with hub 21.

Ticketing services provider 13 is also provided with a plurality of globally-diverse hosts 37-1 and 37-2, hosts 37-1 and 37-2 also being identified herein as Host A and Host B, respectively. Hosts 37-1 and 37-2 are both independently electronically linked to hub 21 via electronic communication paths 39 and 41, respectively, each host 37 comprising a server 43 and a database 45 which are electronically linked together.

Each host 37 is preferably assigned the ticket management services for a particular geographic territory (e.g., North America, South America, Europe, Far East, etc.). Accordingly, hosts 37-1 and 37-2 serve as regional facilities where particular print orders are routed from hub 21, wherein the particular host 37 selected to receive a print order is based upon the territory where the particular manufacturing facility 17 that is constructing the articles in conjunction with the order is located. Upon receiving the print orders, the particular host 37 then manages the release of the print orders to one or more of its associated print centers, as will be described further in detail below.

It should be noted that, for simplicity purposes only, ticketing services provider 13 is shown comprising a pair of hosts 37. However, it is to be understood that the number of hosts 37 utilized by provider 13 could be modified to meet the ticketing services demands of its clients without departing from the spirit of the present invention.

Ticketing services provider 13 is further provided with a plurality of globally-diverse print centers 47-1 through 47-5, each print center 47 comprising, inter alia, a personal computer 35 and a printer 49 which are electronically linked together.

As seen in FIG. 1, each print center 47 is independently electronically linked to a corresponding host 37. Specifically, print centers 47-1, 47-2 and 47-3 are shown as being independently electronically linked to host 37-1 via electronic communication paths 51, 53 and 55, respectively, and print centers 47-4 and 47-5 are shown as being independently electronically linked to host 37-2 via electronic communication paths 57 and 59, respectively.

Each print center 47 is located at a site within the territory assigned to its corresponding host 37. In this manner, upon receiving a particular print order, host 37 is able to select the optimal print center 47 for its ticket printing operations (e.g., the print center 47 located in closest proximity to manufacturing facility 17).

It should be noted that provider 13 is not limited in the number of print centers 47 that it assigns to each of its hosts 37. Rather, the number of print centers 47 assigned to each of its hosts 37 could be modified without departing from the spirit of the present invention. It should also be noted that not all of the print centers 47 are necessarily owned by provider 13 (i.e., some of the print centers 47 may fall outside of the circle defined by provider 13). Rather, a print center located at, or affiliated with, manufacturing facility 17 could be managed by provider 13 as part of the provider's ticketing services without departing from the spirit of the present invention.

An example of one of Avery's proprietary business models for providing global ticketing services to a client will be described herein in conjunction with ticketing system 11. First, the client places a ticket order with provider 13 via hub 21 (the placed ticket order being represented by dashed arrow 61 in FIG. 1). It should be noted that, in the present example, the client placing the ticket order with provider 13 is depicted as either vendor 15 (wherein the emanation of said ticket order is represented by dashed arrow 63 in FIG. 1) or retailer 19 (wherein the emanation of said ticket order is represented by dashed arrow 65 in FIG. 1).

In the ticket order, the client typically specifies the following data (the data being commonly referred to in the art as the ticket order's variable information): (1) ticket information—as defined herein, ticket information relates to the number, format, size and style of ticket stock which is to be used with respect to the order (e.g., 500, double-sided color hang tags); (2) article information—as defined herein, article information relates to visually perceptible information associated with the articles to which the labels are to be affixed (e.g., article size, style, color, etc.); and (3) order information—as defined herein, order information relates to business information associated with the articles to which the labels are to be affixed, such as purchase order (P.O.) information. As can be appreciated, purchase order information can be used to retrieve, among other things, advanced shipping notification (ASN) information for articles associated with a particular purchase order.

Ticketing system 11 preferably allows for the ticket order to be placed by the client in any number of different ways. For example, the ticket order can be placed by the client using electronic data interchange (EDI), proprietary file transfers, web-based orders, email orders, fax orders and/or telephone orders.

The ticket order received by hub 21 is directed to its hub server 23 which, in turn, translates the ticket order into data which utilizes EDI-based formatting. After performing the translation process, hub server 23 performs the two following functions: (1) server 23 stores the raw, translated data in database 25; and (2) server 23 routes the raw, translated data to the particular host 37 responsible for processing the particular ticket order (i.e., the host located in the territory where the articles in the order are being manufactured). In the present example, the translated data is routed to Host B (as represented by dashed arrow 67 in FIG. 1).

Upon receiving the translated data, the host 37 performs a series of calculations to determine, among other things, the most cost-effective manner to process the ticket order. For example, host 37 utilizes complex algorithms to group, or map, the translated data with other data (e.g., additional pending ticket orders) which is similar in nature. As can be appreciated, it has been found that by grouping similar ticket orders, economic benefits can be materialized by jointly printing the orders at the same printing facility.

Based on the results of its calculations, host 37 creates a file which details the particulars of the ticket order to be immediately processed (the ticket order including the original ticket order information as well as the information associated with any other similar, pending ticket orders). Host 37 then releases the file to a particular print center 47. In the present example, the file is released from Host B to print center 47-5 (as represented by dashed arrow 69 in FIG. 1). As noted above, because each host 37 is provided with a plurality of diversely located print centers 47, host 37 preferably releases the ticket order to the print center 47 that is best suited to process the order (e.g., the print center 47 situated in the closest proximity to the manufacturing facility 17 where the articles to be associated with the identification tags are being produced).

Once it receives the file, print center 47-5 commences its tag manufacturing process. Specifically, a personal computer (PC) 35 located at print center 47-5 retrieves the file and, in response thereto, controls the process of printing identification tags using its associated printer 49. It should be noted that the file received by the computer 35 contains all of the client-specified information that is to be associated with the particular ticket order. In accordance therewith, ticket center 47-5 utilizes its printer 49 to complete the manufacture of the identification tags for the ticket order. Once the tag manufacturing process is complete, print center 47-5 delivers the finished tags to manufacturing facility 17 (as represented by dashed arrow 71 in FIG. 1). In the case where manufacturing facility 17 is located in close proximity to print center 47-5, it is to be understood that the costs associated with the delivery are minimized, which is highly desirable.

Preferably, each print center 47 is provided with the technology to impart different types of data onto each identification tag (i.e., data which can be read using different types of conventional data retrieval technologies). For example, print center 47 may impart human-readable printed matter onto a surface of the tag which, in turn, provides a potential customer with relevant details relating to the article (e.g, the size and/or price of the article). As another example, print center 47 may impart automatic identification (auto ID) information onto each tag. As defined herein, the term "automatic identification information" relates to data provided on a tag which can be automatically captured by a computer using an auto ID reading instrument. For instance, a printed bar code system is one well-known and widely used system for relaying information using automatic identification techniques.

At manufacturing facility 17, the supply of finished tags are secured to the individual articles that are being manufactured in accordance therewith. In this manner, each tag serves to display (using either human-readable print or automatic identification means) pertinent information relating to the article to which it is affixed. Having secured each ticket to its associated article, the ticketed articles are then packaged and shipped to retailer 19, as represented by dashed arrow 73 in FIG. 1. At this point, retailer 19 displays the ticketed articles for sale, such as in a retail store.

It should be noted that numerous intermediary facilities (e.g., consolidators, de-consolidators, poolers, distribution centers, etc.) are often involved in the process of shipping the ticketed articles from manufacturing facility 17 to retailer 19.

However, for simplicity purposes only, the ticketed articles are represented herein as being delivered directly from manufacturing facility 17 to retailer 19.

The use of a network-based, global ticketing service business model of the type described in detail above inherently provides a client with a number of significant benefits.

As a first benefit, the client is able to defer the considerable manufacturing costs associated with printing tickets to an expert in the industry. As a result, the client is not required to invest capital in the production costs that are typically associated with the printing, sorting, packing and shipping of individual labels (e.g., labor, equipment and manufacturing facilities).

As a second benefit, the client is able to defer the management services associated with the ticket manufacturing process to an expert in the industry. In this capacity, the client is ensured that ticket orders are processed in a timely, efficient, accurate and cost-effective manner.

As a third benefit, the ticket order mapping algorithms used by hosts 37 allow for multiple ticket orders which are similar in nature to be bundled together for processing in order to minimize production costs. In addition, the algorithms minimize shipment costs by assigning print orders to print centers 47 located in close proximity to a manufacturing facility 17.

It should be noted that a similar but subsequent approach to Avery's above-described proprietary business model for providing global ticketing services is described in U.S. Patent Application Publication No. 2003/0061217 to P. K. Whittingham et al., which is incorporated herein by reference.

As noted briefly above, identification tags are commonly provided with information using automatic identification (auto ID) means. In this manner, the information provided on the tag can be automatically captured using the combination of a reader and a computer. Some examples of automatic identification means include bar codes, smart cards, voice recognition software, biometric technologies (such as retinal scans), optical character recognition and radio frequency identification (RFID). The principal benefit associated with automatic data capture relates to the relative ease, simplicity, quickness and accuracy of uploading data into a computer by eliminating the need for manual data entry.

In the retail industry, automated bar code systems are well-known and widely used to automatically exchange data relating to a particular item. Simply stated, a bar code is a stamp-sized patch of variable thickness, parallel lines with variable spacing provided between successive lines. Using a bar code reader, which includes the combination of an infrared or light emitter and an optical detector, the pattern of lines in a bar code can be captured by a computer which translates said pattern into a numeric code that, in turn, can be used to retrieve data. Commonly, bar coding is utilized in the retail industry to scan articles for purchase into a retail register, thereby providing a retailer with a quick, efficient and accurate means for calculating the cost associated with the purchase of an item at the point-of-sale.

Bar code systems are capable of storing a relatively small amount of data. As a result, bar code systems have been traditionally used in the art to identify only the manufacturer, product and version of a particular product. Bar code systems are not typically used to uniquely identify each individual article of commerce from similar articles of commerce. As an example, bar coding is commonly used to identify an article as a 12 ounce can of a particular soft drink. However, bar coding is not typically used to uniquely identify (i.e., distinguish) one 12 ounce can of soda from an identical 12 ounce can of soda.

As can be appreciated, the retail industry has recently recognized that a number of considerable benefits arise from being able to uniquely identify individual articles of commerce. As a result, the retail industry is currently exploring the use of supplemental means of automatic identification (other than traditional bar codes) in accordance with its articles of manufacture.

Specifically, the electronic product code (EPC) is a well-known identification coding system which has recently grown into prominence in the retail ticketing industry. The electronic product code is particularly useful in that it is capable of providing a relatively large number of unique identification codes for articles of commerce. In fact, a 96 bit electronic product code system provides unique identification codes for 268 million companies, wherein each company is able, in turn, to assign 16 million object classes and 68 billion serial numbers in each class. As can be appreciated, the implementation of a 96 bit electronic product code system in the retail industry would adequately cover all products manufactured worldwide in the present and in the immediate future.

One means for implementing the electronic product code is through the use of radio frequency identification (RFID) technology. In particular, many companies in the retail and retail ticketing industries have supplemented and in some cases replaced the use of traditional bar codes with radio frequency identification (RFID) tags, each RFID tag being designed for securement to an individual article of commerce (as well as shipping containers and pallets which house the individual articles). When used to label an item, each RFID tag is assigned a unique EPC-based identification code (e.g., EPC-global-based code) to provide retailers with a means for uniquely identifying each item or article of commerce in the supply chain, as will be described further below.

RFID devices are most commonly categorized as labels or tags. Some examples of RFID tags and labels appear in U.S. Pat. Nos. 6,107,920, 6,206,292 and 6,262,292. RFID labels are RFID devices that are adhesive or otherwise have a surface that is attached directly to objects. RFID tags, in contrast, are secured to objects by other means, for example by use of a plastic fastener, string or other fastening means. RFID tags, labels or other marking media used in the garment and accessories retail industry can include, for example, pressure sensitive adhesive labels, heat transfer labels, printed fabric labels, woven labels, graphic hang tags, price tickets, loop tags, and pocket flashers. RFID devices are referred to herein somewhat interchangeably as "tags" or "labels", and references to "RFID tags" may indicate any of these types of marking or identification media, and others.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag.

Referring now to FIG. 2, there is shown an exploded, top perspective view of one type of RFID tag that is well known in the art, the RFID tag being identified generally by reference numeral 75. RFID tag 75 comprises an RFID inlay 77 that is secured to the underside of a printable face sheet (or facestock) 79 by means of a first layer of pressure sensitive adhesive 81. The underside of RFID inlay 77 is in turn releasably secured to a liner sheet 83 by means of a second layer of pressure sensitive adhesive 85 so as to form a unitary RFID tag assembly, the RFID tag assembly being identified generally by reference numeral 87.

As seen most clearly in FIG. 3, RFID inlay 77 includes a substrate 89, an antenna 91 disposed on one surface of substrate 89 and an RFID integrated circuit (IC) chip 93 coupled to antenna 91. As will be described further below, IC chip 93 is designed to generate a radio frequency signal which is in turn propagated by antenna 91.

Integrated circuit chips which are used in RFID applications are typically categorized by class. A class 0 integrated circuit chip is defined as having a memory capacity of 64 or 96 bits (this memory capacity being commonly referred to in the art as "user-defined" memory) and read only capabilities (i.e., preprogrammed with data that can be read multiple times but that can not be reprogrammed). A class 1 integrated circuit chip is defined as having a memory capacity of 64 or 96 bits and limited read/write capabilities (i.e., data can be written into said chip once but read multiple times). A class 2 integrated circuit chip is defined as having a memory capacity of 96 to 256 bits (i.e., a greater maximum memory capacity than both the class 0 and the class 1 IC chips) and unlimited read/write capabilities (i.e., can be read and reprogrammed multiple times).

For purposes of simplicity only, IC chip 93 is defined herein as being a class 1 integrated circuit chip which can be programmed a single time to include an automatic identification code. However, it is to be understood that IC chip 93 could be replaced with any other IC chip which is well-known in the art without departing from the spirit of the present invention.

Facestock 79 is preferably constructed using a print-receptive material, such as paper. During the construction of tag 75, printed matter is preferably provided onto the front surface of facestock 79 in order to communicate information relating to the product to which RFID label 75 is secured.

Liner sheet 83 includes a backing 95 and a release coating 97 applied to the top surface of backing 95. Liner sheet 83 may serve as a common web on which a plurality of RFID labels 75 are retained, with adjacent labels 75 being spaced apart from one another by a distance of approximately ⅛ to ¼ inch. In this manner, a continuous supply of label assemblies 87 can be formed into a roll which can be then be used in an assembly line environment.

Backing 95 is preferably a length of polyethylene terephthalate film, a length of Mylar® polyester film, or a strip of paper. Release coating 97 is typically a silicone or wax release from which label 75 can be manually removed, thereby exposing adhesive layer 85 of RFID label 75. Having been removed from release coating 97, RFID label 75 can be disposed against a desired article with adhesive layer 85 directly contacting the article so as to secure RFID label 75 thereto.

RFID label 75 can be used in the retail industry to wirelessly transmit data associated with a particular article to a computer system. Specifically, referring now to FIG. 4, there is shown a retail environment which is represented generally by reference numeral 99. In retail environment 99, RFID label 75 is shown affixed onto an article of commerce A. As noted above, integrated circuit chip 93 of RFID label 75 is preferably programmed to include a unique identification code (e.g., using the electronic product code system) which can be captured by a computer using radio frequency technology.

Retail environment 99 additionally includes an RFID reader 101 which is designed to retrieve the unique identification code using radio frequency technology. Reader 101 is electrically connected to an antenna 103 which is located in the general vicinity (e.g., several meters) of radio frequency identification tag 75. Reader 101 is additionally electrically connected to a computer 105 which is designed to link codes captured by reader 101 with pertinent information relating to article A.

Retail environment 99 operates in the following manner. RFID reader 101 periodically generates an interrogation signal which is, in turn, transmitted by antenna 103, the interrogation signal being represented generally by reference numeral 107. When subjected to interrogation signal 107, integrated circuit chip 93 becomes active and converts its stored identification code into a corresponding electromagnetic signal which is, in turn, propagated as radio frequency waves by antenna 91, the propagated signal being represented generally by reference numeral 109. If antenna 103 is located within a defined range of RFID label 75, antenna 103 transmits signal 109 to RFID reader 101 which then converts signal 109 into a digital code. Computer 105 utilizes the digital code as a license plate to locate within a network, such as the internet, selected pieces of information relating to article A (e.g., its price, SKU, etc.). More specifically, computer 105 sends a query over a network to an object name service (ONS) database which, in turn, functions in a manner similar to a reverse telephone directory by associating the retrieved digital code with a particular network address. This particular network address then directs computer 105 to a physical markup language (PML) server which includes detailed information associated with article A (the information having been manually input into the PML server during a previous data entry process).

The use of radio frequency identification technology in the retail industry introduces a number of notable advantages.

As a first advantage, the use of RFID technology eliminates the need for a direct line of sight during the automatic exchange of data (which is presently required in bar code systems). In fact, because many conventional RFID systems operate in a range of several meters, there is often little need for the handling of individual articles during the data exchange data process. Because human involvement is minimized during the data exchange process, the risk of human error introducing data inaccuracies can be significantly reduced.

As a second advantage, the use of RFID technology allows for a large quantity of data to be exchanged within a relatively short period of time. More importantly, the use of RFID technology allows for each individual article of commerce in the world today to be assigned a unique identification code, thereby providing a means for monitoring and retrieving useful information relating to individual articles.

As a third advantage, RFID technology is effective in visually and environmentally challenging conditions. For example, because the RFID inlay is sealed within the tag, the IC chip is adequately protected from harsh outside elements. To the contrary, traditional bar codes are directly exposed to outside elements which can compromise their integrity and, as a consequence, their functionality.

As a fourth advantage, because RFID technology allows for the extraction of data automatically, labor costs typically associated with the exchange of data in the retail industry can be minimized.

As a fifth advantage, due to the simplicity and cost-effective manner in which information can be readily extracted from an integrated circuit chip, data can be extracted from an RFID label at a greater number of locations and/or with greater frequency during the supply chain. As a result, RFID technology affords a client with the capability to more adequately monitor inventory (with updates generated in real-time). Greater monitoring of inventory affords the client with greater product control (security), an increased efficiency in supplying/stocking a retailer with the proper amount of product (i.e., greater efficiency in managing safety-stock inventory) and a greater ability to locate a product (e.g., within a large warehouse).

Further advantages associated with the use of RFID technology in retail environments are described in U.S. Patent Application Publication No. 2002/0038267 to N. Can et al., and U.S. Patent Application Publication No. 2003/0132854 to R. J. Swan et al., both of these publications being incorporated herein by reference.

Although RFID technology allows for the association of a large quantity of information with respect to a particular product, current trends in the retail industry have limited the types of data which are tracked with respect to a particular article of commerce. Notably, although RFID technology is currently used to communicate article information (i.e., visually perceptive information, such as size, shape, style and/or color), RFID technology is not presently used to communicate order information (i.e., business information) for individual articles of commerce.

Accordingly, the applicant recognizes a particular need for individual identification tags, such as RFID tags, to be used in the retail industry to provide the specific order information (e.g., purchase order information) that is associated with an individual article of commerce. As will be described in greater detail below, the present invention: (1) recognizes this need for implementing a process in which an individual identification tag can be used to retrieve order information relating to the particular article to which it is affixed; (2) provides a means for implementing this process; and (3) enumerates a multitude of applications in the retail industry where this process can be used in order to realize considerable benefits.

SUMMARY OF THE INVENTION

It is an object of the present invention to provide a new and improved method for processing a ticket order.

It is another object of the present invention to provide a method as described above which results in the production of an identification tag that includes a unique identification code.

It is yet another object of the present invention to provide a method as described above wherein the unique identification code can be used to retrieve data relating to the article to which the identification tag is affixed.

It is still another object of the present invention to provide a method as described above wherein the unique identification code can be used to retrieve order information (e.g., purchase order information) relating to the article to which the identification tag is affixed.

It is yet still another of the present invention to provide a method as described above wherein the unique identification code can be automatically captured by a computer using radio frequency identification (RFID) technology.

It is another object of the present invention to provide a method as described above which further creates a file linking the unique identification code with the order information.

Accordingly, there is provided a method of processing a ticket order for an article, the ticket order being placed by a client, the ticket order requesting the production of an identification tag for the article, wherein the identification tag can be provided with a unique identification code, the article having order information associated therewith, the method comprising the steps of (a) receiving the ticket order for the article, (b) associating a unique identification code with the identification tag, (c) creating a file which cross-references the unique identification code for the identification tag with the order information relating to the article, and (d) storing the file in a database.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 5:
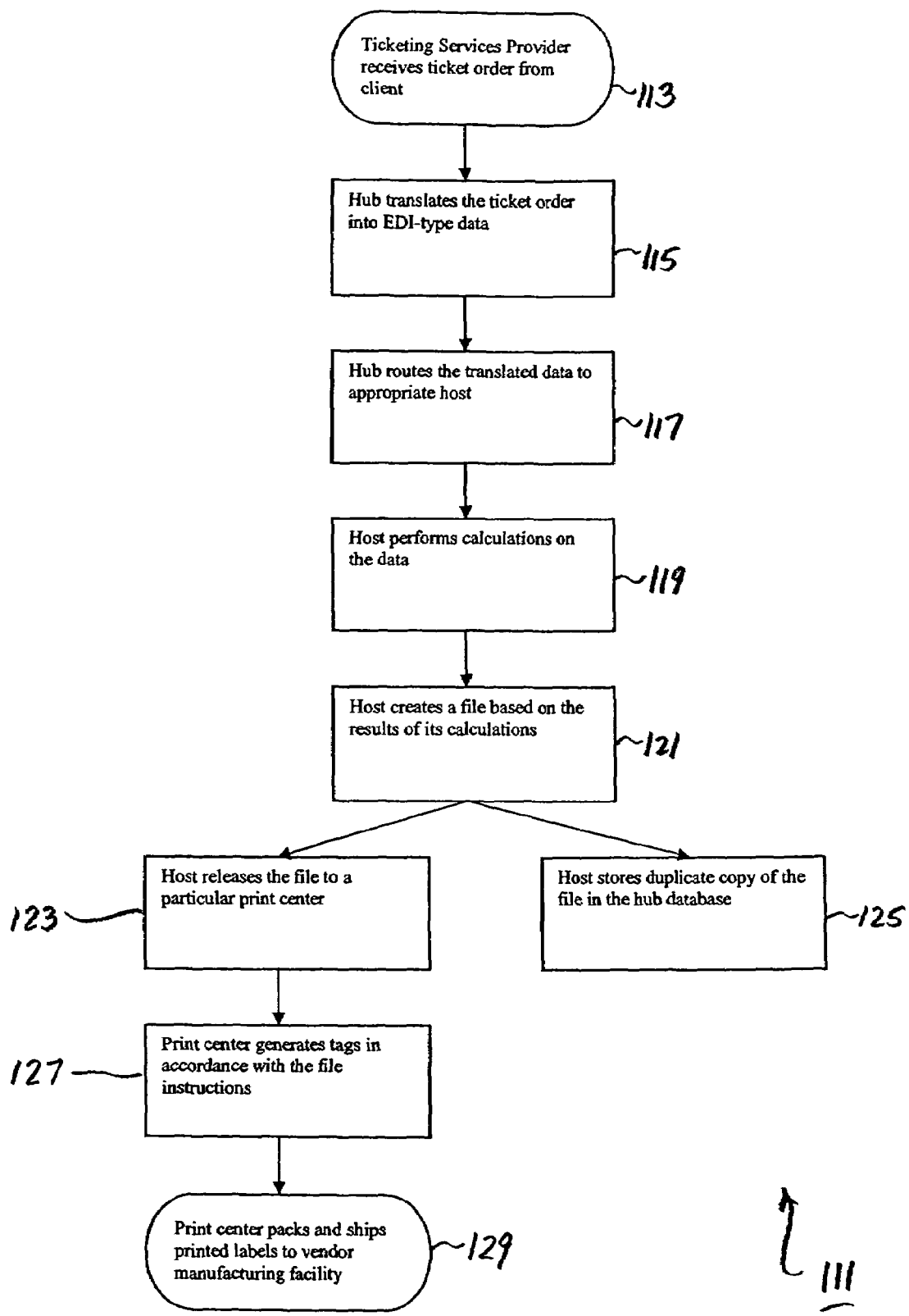
FIG. 5 is a flow chart depicting a novel method of processing a ticket order, the method being provided in accordance with the teachings of the present invention.

Referring now to FIG. 5, there is shown a flow chart depicting a method of processing a ticket order for at least one article, the method being provided in accordance with the teachings of the present invention and identified by reference numeral 111. For purposes of simplicity and understanding, method 111 will be described herein in conjunction with the ticketing system depicted in FIG. 1, the ticketing system being represented generally by reference number 11. However, it is to be understood that method 111 could be implemented in conjunction with a wide variety of differently structured ticketing systems without departing from the spirit of the present invention.

Figure 1:
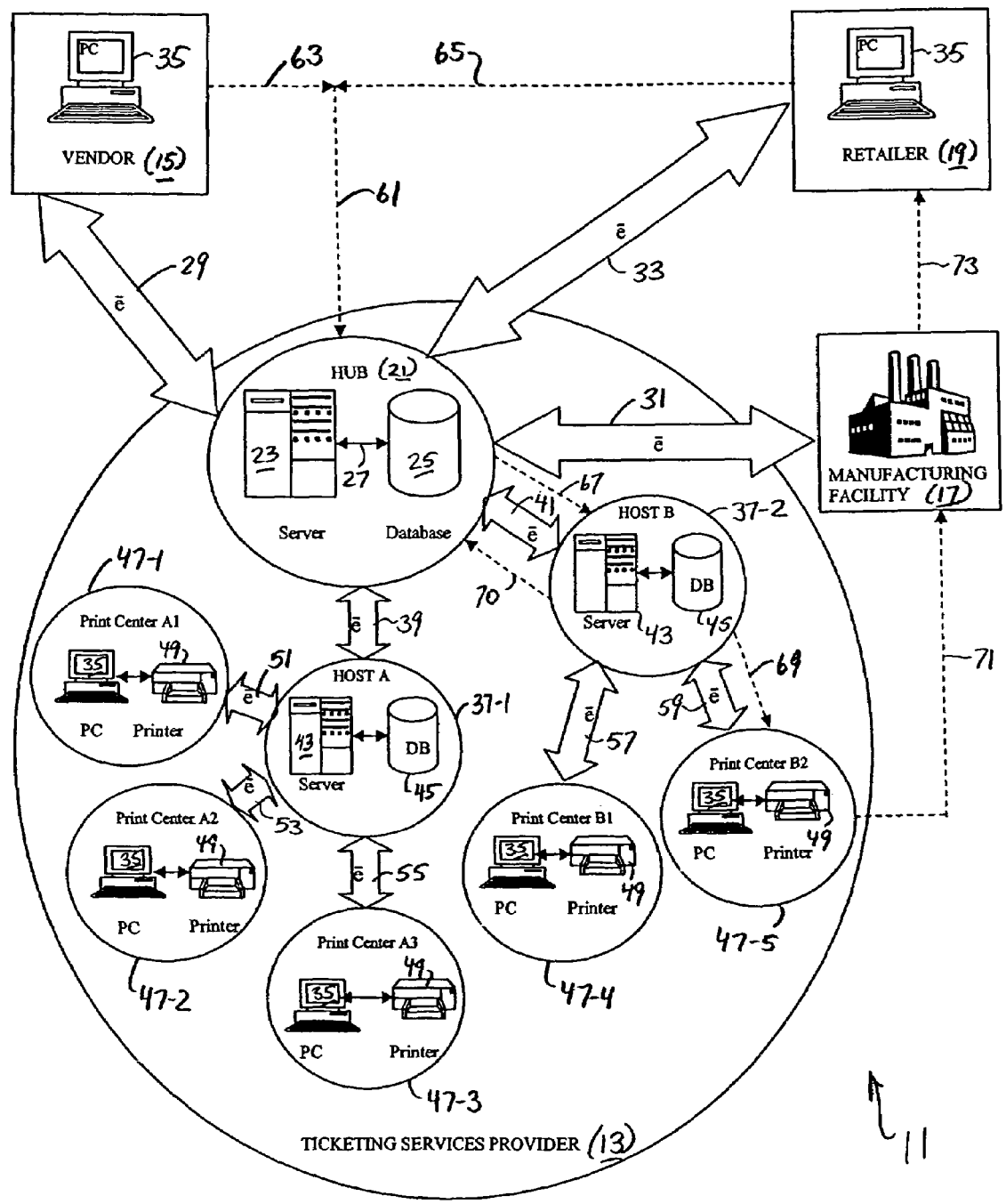
FIG. 1 is a simplified block diagram of a ticketing system which is useful in understanding different business models for providing global ticketing services.
Figure 3:
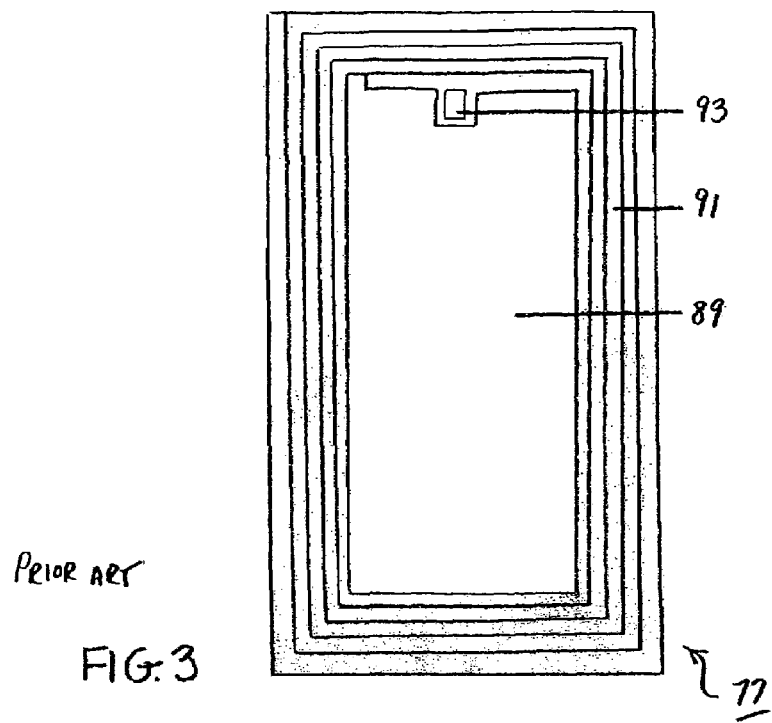
FIG. 3 is a top plan view of the radio frequency inlay shown in FIG. 2.

In the first step of method 111, ticketing services provider 13 receives a ticket order for at least one article of commerce from a client (e.g., vendor 15 or retailer 19), the receiving step being identified generally by reference numeral 113 in FIG. 5 as well as by dashed arrow 61 in FIG. 1. Preferably, the ticket order is placed by the client using a computer 35 and is sent directly to hub 21 using an electronic communication path, such as the internet. However, it is to be understood that the ticket order could be sent from the client to provider 13 using alternative communication means (e.g., using fax orders and/or telephone orders).

The ticket order placed by the client preferably specifies the following data (this data being commonly referred to in the art as the ticket order's variable information): (1) ticket information—as defined herein, ticket information relates to the number, format, size and style of ticket stock which is to be used with respect to the order (e.g., 500, double-sided color hang tags); (2) article information—as defined herein, article information relates to visually perceptible information associated with the articles to which the labels are to be affixed (e.g., article size, style, color, etc.); (3) order information—as defined herein, order information relates to business information associated with the articles to which the labels are to be affixed, such as purchase order (P.O.) information; and (4) item identification information—as defined herein, item identification information relates to specific details with respect to the particular unique identification codes that are to be used in conjunction with the ticket order. For example, the client may specify, among other things, the first, last and/or range of specific unique ID codes to be used in conjunction with the ticket order. It should be noted that the furnishing of item identification information by the client is optional and is only applicable when ticketing services provider 13 assigns a unique identifying code to a particular identification tag. In other words, item identification information is not supplied by the client in those circumstances in which the identification tag to be utilized in the ticket order is an RFID tag that includes a preprogrammed integrated circuit chip (i.e., an RFID tag with a class 0 integrated circuit chip).

The ticket order received by hub 21 in step 113 is in turn directed to its hub server 23. Upon receiving the particular ticket order, hub server 23 translates the ticket order into data which uses an EDI-based format, the translation step being identified generally by reference numeral 115 in FIG. 5.

After performing translation step 115, hub server 23 routes the raw, translated data corresponding to the ticket order to the particular host 37 responsible for processing the particular ticket order (i.e., the host located in the territory where the articles in the order are being manufactured), the routing step being identified generally by reference numeral 117 in FIG. 5 as well by dashed arrow 67 in FIG. 1. It should be noted that hub server 23 additionally preferably stores the raw, translated data corresponding to the ticket order in hub database 25. It should also be noted that, since host 37 is in constant communication with hub 21, hub 21 is provided with the capability to continuously monitor the status of all pending ticket orders, which is highly desirable.

Upon receiving the data, host 37 performs a series of calculations on the data which, in turn, results in the generation of a ticket order file, the calculation step being identified generally by reference numeral 119 in FIG. 5. In calculation step 119, host 37 determines, among other things, the most cost-effective manner in which to process the data as a ticket order. For example, host 37 utilizes complex algorithms to group, or map, the translated data with other data (e.g., additional pending ticket orders) which is similar in nature.

Based on the results of its calculations, host 37 creates a file which details particular information relating to the ticket order to be immediately processed, the file creation step being identified generally by reference numeral 121 in FIG. 5. For example, the file preferably includes all of the variable information relating to the ticket order to be processed (namely, the ticket information, article information, order information and item identification information for the ticket order). In particular, it should be noted that the file serves to assign the order information relating to each individual article in the ticket order with a corresponding unique identification code, the unique identification code being provided on the identification tag to be affixed to said article. As will be described further below, the ability to retrieve the order information for an individual article of commerce through the use of a unique identification code system provides with process 111 with a number of notable advantages.

It should be noted that process 111 is not limited to any particular type of unique identification coding system. For example, process 111 may utilize an EPCglobal-based identification coding system. As another example, process 111 may utilize a dynamic code calculation system that incorporates a character string comprising, but not limited to, some of the following data: (i) a sequential identification code; (ii) a vendor identification code; and (iii) a low-level style number for the article (e.g., a three-digit SKU number for the article). The utilization of a dynamic code calculation system of the type as described above allows for future code expansion (i.e., the integration of additional clients, items, etc.) with relative ease and without disrupting codes that have already been established.

Having created a ticket order file in step 121, host 37 in turn releases the file to a particular print center 47, the file releasing step being identified generally by reference numeral 123 in FIG. 5 as well as by dashed arrow 69 in FIG. 1. As noted above, because each host 37 is provided with a plurality of diversely located print centers 47, host 37 preferably releases the file to the print center 47 that is best suited to process the order (e.g., the print center 47 situated in the closest proximity to the manufacturing facility 17 where the articles to be associated with the identification tags are being produced).

Simultaneous to the execution of step 123, host 37 transmits a duplicate copy of the ticket order file back to hub 21 which, in turn, stores the file in hub database 25, the file transmission and storage step being identified generally by reference numeral 125 in FIG. 5 as well as by dashed arrow 70 in FIG. 1. By storing the file in database 25, method 111 provides the client with a means for accessing the order information for each tagged article of commerce, which is highly desirable for reasons to be discussed in detail below. Further, the transmission of the file back to hub 21 can be used to provide hub 21 with information relating to the status of the original pending ticket order (i.e., that the ticket order has been forwarded to a particular print center 47 for processing).

Once it receives the file, print center 47 commences its tag manufacturing process in accordance therewith, the step being identified generally by reference numeral 127 in FIG. 5. Preferably, each print center 47 is provided with a printer 49 that has capability to print human-readable information as well as to perform integrated circuit programming (i.e., includes an IC chip writer).

Figure 2:
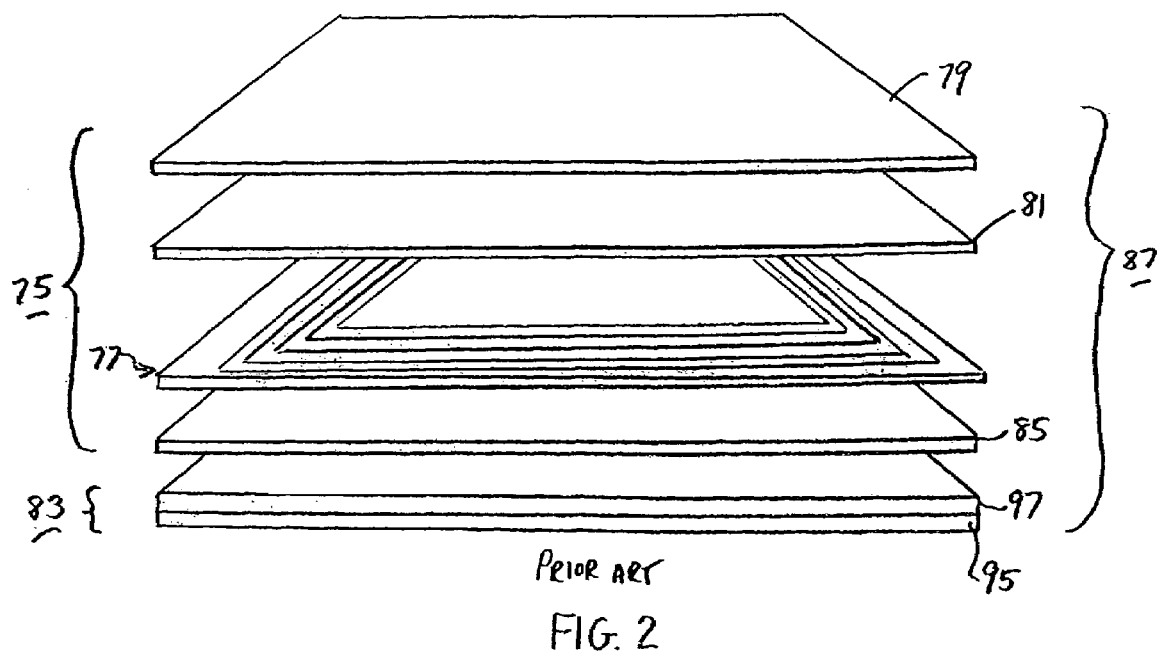
FIG. 2 is an exploded top perspective view of a prior art radio frequency identification tag which can be used in association with ticketing systems of the type depicted in FIG. 1.
Figure 4:
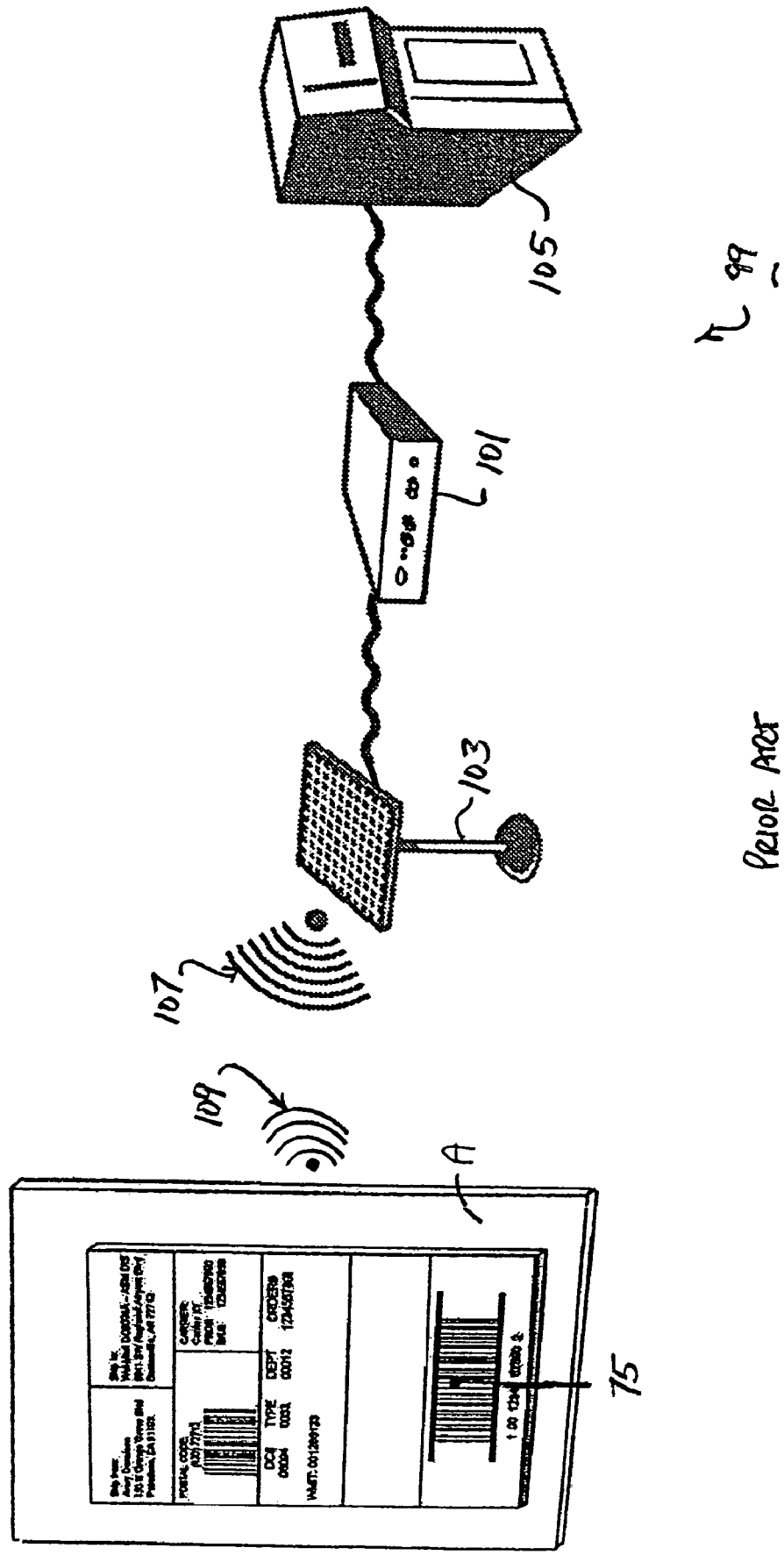
FIG. 4 is a simplified perspective view of a prior art retail environment which utilizes radio frequency identification technology to automatically transfer data from an RFID label to a computer.

It should be noted that each identification tag generated in step 127 of process 111 is described herein as being preferably an RFID label of the type shown in FIG. 2, the RFID label 75 comprising a class 1 integrated circuit chip 93 (i.e., an IC chip which can be programmed once). However, it is to be understood that step 127 of process 111 is not limited to the generation of any particular type of identification tag. Rather, it is to be understood that the identification tag generated in step 127 is meant to encompass any conventional type of identification tag that can be provided with a unique identification code (e.g., by providing the tag with a unique printed barcode, unique printed serial number or a unique code preprogrammed into an integrated circuit) without departing from the spirit of the present invention. Preferably, the unique identification code assigned to each tag can be captured by a computer using conventional auto-ID means (e.g., using well-known barcode and/or RFID technology).

Once the process of manufacturing one or more identification tags is complete in step 127, print center 47 delivers the finished tags to manufacturing facility 17, the delivery step being represented generally by reference numeral 129 in FIG. 5 as well as by dashed arrow 71 in FIG. 1. At manufacturing facility 17, each identification tag is secured to the individual article that is being manufactured in accordance therewith. In this manner, each tag serves as a means of linking pertinent information relating to the article (e.g., using either human-readable print or automatic identification coding) to the article itself. With each tag secured to its corresponding article, the ticketed articles are then packaged and shipped to a retailer 19 where it is displayed for sale.

Figure 6:
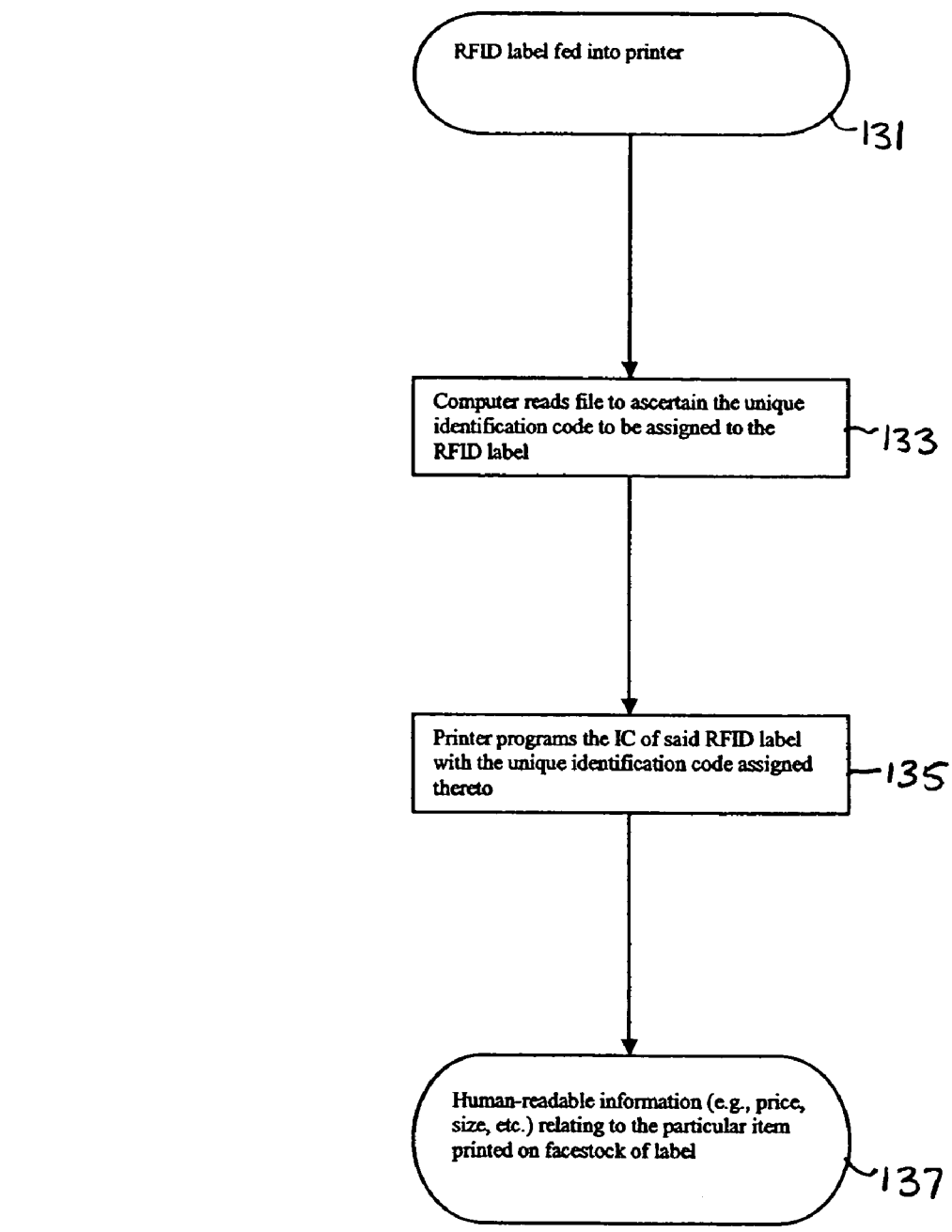
FIG. 6 is a flow chart which depicts in greater detail the tag generation step shown in FIG. 5.

Referring now to FIG. 6, there is shown a flow chart which depicts in greater detail the process behind identification tag production step 127. For simplicity purposes only, tag production step 127 is described herein in conjunction with the manufacture of RFID label 75. However, as noted above, step 127 could be utilized to produce alternative types of identifying tags which are well known in the art without departing from the spirit of the present invention.

In the first step of process 127, RFID label 75 is fed into printer 49, the feeding step being identified generally by reference numeral 131. It should be noted that a roll of RFID label assemblies 87 is preferably fed into printer 49 to allow for the continuous production of identification tags.

Computer 35 connected to printer 49 is then used to read the file released by host 37 to ascertain the particular unique identification code that is to be assigned to each particular label, this step being identified generally by reference numeral 133 in FIG. 6. As can be appreciated, by providing each article with a unique identification code, order information for a particular product can be retrieved by means of its identification tag. As will be described in greater detail below, the ability to associate an individual article with all pertinent information relating to its manufacture and sale affords the vendor and/or retailer of said article with a number of significant advantages.

In response to an instruction from computer 35, printer 49 then programs integrated circuit chip 93 with the unique identification code that is assigned for that particular tag, the programming step being identified generally by reference 135 in FIG. 6.

After completion of step 135, computer 35 instructs printer 49 to print any human-readable, client-specified information relating to the article onto the facestock 79 of the identification tag, the printing step being identified generally by reference numeral 137 in FIG. 6. Examples of the types of information that may be printed onto facestock 79 include one or more bar codes, a SKU number and/or vendor information associated with the article.

As noted above, a duplicate copy of the file created by host 37 during step 121 is stored in hub database 25. In the file, the unique identification code for each tag is cross-referenced with pertinent order and article information relating to the product to which the ID tag is affixed. As can be appreciated, the ability to readily associate the unique identification code assigned to an ID tag with any/all of the unique merchandise order information (e.g., purchase order information) relating to the product to which the tag is affixed provides the client with a plurality of notable advantages, which will be described further below. It is for this reason that this capability serves as a principal novel feature of the present invention.

Accordingly, it is to be understood that the present business model provides the client with a means for accessing the information contained within the file. For example, hub 21 may electronically transmit the file to the client for review. In this circumstance, the hub 21 may group multiple files and transmit them together to the client at client-specified intervals (e.g., once a week). As another example, the client may be provided with means for electronically viewing the file within database 25 (i.e., as web-accessible, read-only data). As another example, hub 21 may use the file to a generate a user-friendly report, wherein the report is distributed to the client in any conventional manner (e.g., via email or first class mail).

As noted above, storing the file in hub database 25 is a principal novel feature of the present invention. A sampling of the numerous potential advantages which can be realized by the client based on its ability to readily associate the unique identification code assigned to an ID tag with any/all of the unique merchandise order information (e.g., purchase order information) relating to the product to which the tag is affixed are listed below:

(1) Anti-Counterfeit Applications: The information contained in the file generated in step 121 can be used to identify counterfeit articles which have been introduced into the client's supply chain. As an example, a tagged product which includes an invalid or duplicate identification code may suggest that the product is counterfeit.

(2) Anti-Diversion Applications: Utilizing the unique identification code which is assigned to a tagged article, a client can retrieve order information associated with the article that relates to the particular delivery path designated for the article. In this manner, if the particular location of the article at the time of examination does not match the delivery path stipulated in the processed ticket order report, the client can deduce that the article, at some point during the supply chain, was improperly diverted to the wrong location. By monitoring the article at numerous stages during its delivery, greater precision can be afforded in deducing when the improper article diversion first occurred. Accordingly, with greater policing of the delivery path for the article, improper article diversion can be exposed and eliminated.

(3) Article Return Applications: At the point of purchase for an article, a retailer may store a file that electronically links certain purchase information (e.g., name of purchaser, date of purchase, location of purchase, cost of article at purchase, credit card utilized for purchase) with the unique identification code designated for the article. Accordingly, a consumer who desires to return a particular article would only need to present the identification tag to the retailer to process the return. To the contrary, the consumer would not need a sales receipt or other traditional proof of purchase to execute the return. The retailer, utilizing the unique identification code associated with the tagged article, would then be able to retrieve any relevant information relating to the purchase of said article. In this manner, it is to be understood that the retailer can use the unique identification code to deter against certain well-known forms of unscrupulous return activity, such as: (i) delayed returns (i.e., returns made past the retailer's acceptable time period); (ii) purchase price disputes (i.e., establishing the actual price of the article at the time of purchase); (iii) theft returns (i.e., returns made on stolen articles); (iv) swapped article returns (i.e., returning an older, damaged and/or less expensive version of the article rather than the article actually purchased); and (v) improper location of return (i.e., returning an article to a different place than where the article was originally purchased).

(4) Article Quality Applications: By electronically linking the unique identification code for an article with order information relating to the article, a client is able to readily retrieve vendor manufacturing information associated with that article. In this manner, the client is able to ascertain the point of origin (i.e., the particular manufacturing facility or even a particular department within said manufacturing facility) of defective or otherwise inferior articles.

(5) Article Tracking Applications: If RFID readers are installed at all stages of the retail supply chain, the unique identification code assigned to every article that a manufacturer produces can be used to provide a client with real-time visibility of the articles at all stages of the supply chain. In this manner, a client is able to monitor the completeness and/or timeliness of a shipment.

(6) Auditing/Inventory Management Applications: The utilization of an automatic identification system for individual articles of commerce enables a client to perform fast, accurate and frequent auditing of its inventory. In particular, it should be noted that the use of automatic data retrieval (e.g., RFID technology) minimizes the labor costs associated with more traditional auditing services and, in addition, allows for the recuperation of lost margin dollars which result from inaccurate manual data exchange. Furthermore, the routine auditing of inventory can be used to both (i) verify the accuracy of inbound and outbound shipments and (ii) render storage facilities more efficient. As an example, a retailer who routinely stores an excessive amount of excess product can reduce the size of future shipments of the product, thereby reducing storage costs. As another example, a retailer who routinely stores an inadequate amount of product can increase the size or frequency of shipments to more adequately meet customer demands.

(7) Security Applications: The association of an automatic identification code for each individual article of commerce enables a client to more accurately track the location of its articles. As a result, the risk of theft/shrinkage at all points during the supply chain can be minimized. For example, freight loss (i.e., the loss of product within a shipment) can be quickly detected and accurately traced to a particular participant in the product supply chain. As another example, customer and employee theft can be reduced at the store level of the supply chain.

As can be appreciated, the potential uses of the present invention are numerous. It should be noted that other potential applications of the present invention that are not expressly stated herein could be realized without departing from the spirit of the present invention.

The embodiment shown in the present invention is intended to be merely exemplary and those skilled in the art shall be able to make numerous variations and modifications to it without departing from the spirit of the present invention.

As an example, the above-described method of processing a ticket order is described herein as being used to in conjunction with individual articles of commerce. However, it is to be understood that the novel ideas described herein could be implemented with respect to a group of individual articles (e.g., a case or crate of articles) without departing from the spirit of the present invention. In this situation, an identification code would be assigned to the particular group of articles and would be linked directly with relevant information relating to the group of articles.

All such variations and modifications are intended to be within the scope of the present invention as defined in the appended claims.

What is claimed is:

1. A method of processing a ticket order for a plurality of articles to be supplied from a vendor to a retailer, the ticket order being placed by a client, the ticket order requesting the production of an identification tag for each of the plurality of articles, wherein each identification tag can be provided with a unique identification code, each of the plurality of articles having business information between the vendor and retailer associated therewith, the method comprising the steps of:
    (a) receiving the ticket order for the plurality of articles,
    (b) associating a unique identification code for each identification tag,
    (c) after the associating step, creating a file which cross-references the unique identification code for each identification tag with the business information relating to the corresponding article with which the tag is associated, and
    (d) storing the file in a database.

2. The method of claim 1 wherein the file is electronically retrievable from the database by the client.

3. The method of claim 1 further comprising the step of generating a report using the file stored in the database.

4. The method of claim 3 further comprising the step of distributing the report to the client.

5. The method as claimed in claim 1 wherein the unique identification code can be automatically captured by a computer.

6. The method as claimed in claim 5 wherein the unique identification code can be automatically captured by a computer using barcode technology.

7. The method as claimed in claim 5 wherein the unique identification code can be automatically captured by a computer using radio frequency identification (RFID) technology.

8. The method as claimed in claim 1 wherein the unique identification code is written in compliance with the electronic product code (EPC).

9. The method as claimed in claim 1 wherein the unique identification code is calculated using a dynamic unique identification coding system.

10. The method as claimed in claim 1 wherein the business information associated with the plurality of articles includes the purchase order information between the vendor and the retailer for at least one of the plurality of articles.

11. The method as claimed in claim 1 further comprising the step of cross-referencing the unique identification code for an article with the file stored in the database in conjunction with anti-counterfeit applications.

12. The method as claimed in claim 1 wherein the business information associated with the plurality of articles includes location information relating to the path of delivery from the vendor to the retailer for at least one of the plurality of articles.

13. The method as claimed in claim 12 further comprising the step of cross-referencing the location of one of the plurality of articles with the location information associated with the one of the plurality of articles in conjunction with anti-diversion applications.

14. The method as claimed in claim 1 wherein the business information additionally includes purchase information relating to the sale of one of the plurality of articles between the retailer and a consumer.

15. The method as claimed in claim 14 further comprising the step of retrieving the purchase information for one of the plurality of articles in conjunction with article return applications.

16. The method as claimed in claim 1 wherein the business information additionally includes manufacturing information relating to the facility in which one of the plurality of articles was produced.

17. The method as claimed in claim 16 further comprising the step of retrieving the manufacturing information in conjunction with article quality applications.

18. The method as claimed in claim 1 further comprising the step of using the unique identification code associated with each of the plurality of articles in conjunction with article tracking applications.

19. The method as claimed in claim 1 further comprising the step of using the unique identification code associated with each of the plurality of articles in conjunction with inventory management applications.

20. The method as claimed in claim 1 further comprising the step of using the unique identification code associated with each of the plurality of articles in conjunction with article security applications.

* * * * *